US009748861B2

(12) United States Patent
Janssen et al.

(10) Patent No.: US 9,748,861 B2
(45) Date of Patent: Aug. 29, 2017

(54) METHOD AND DEVICE FOR OPERATING AN ELECTRICAL POWER CONVERTER

(71) Applicant: GE ENERGY POWER CONVERSION TECHNOLOGY LIMITED, Warwickshire (GB)

(72) Inventors: Martin Janssen, Berlin (DE); Niels Weitendorf, Berlin (DE)

(73) Assignee: GE ENERGY POWER CONVERSION TECHNOLOGY LTD (GB)

(*) Notice: Subject to any disclaimer, the term of this patent is extended or adjusted under 35 U.S.C. 154(b) by 433 days.

(21) Appl. No.: 14/453,145

(22) Filed: Aug. 6, 2014

(65) Prior Publication Data

US 2015/0043259 A1    Feb. 12, 2015

(30) Foreign Application Priority Data

Aug. 9, 2013    (DE) .......................... 10 2013 108 670

(51) Int. Cl.
*H02M 7/44*    (2006.01)
*H02M 7/487*    (2007.01)

(52) U.S. Cl.
CPC ............. *H02M 7/44* (2013.01); *H02M 7/487* (2013.01)

(58) Field of Classification Search
CPC ............ H02M 5/40; H02M 5/42; H02M 5/45; H02M 5/453; H02M 5/458; H02M 7/483;
(Continued)

(56) References Cited

U.S. PATENT DOCUMENTS 5,627,742 A * 5/1997 Nakata ...................... B60L 9/22
                                                   323/235
5,910,892 A * 6/1999 Lyons ................... H02M 7/487
                                                   363/132
(Continued)

FOREIGN PATENT DOCUMENTS

DE    102009039195 A1    3/2011
EP        0642212 A1    3/1995
(Continued)

OTHER PUBLICATIONS

Busquets-Monge et al., "Closed Loop Control Design for a Three-Level Three-Phase Neutral-Point-Clamped Inverter Using the Optimized Nearest-Three Virtual-Space-Vector-Modulation", Power Electronics Specialists Conference, PESC, Jun. 18-22, 2006, pp. 1-7.

(Continued)

*Primary Examiner* — Emily P Pham
*Assistant Examiner* — Shahzeb K Ahmad
(74) *Attorney, Agent, or Firm* — GE Global Patent Operation; Scott R. Stanley

(57) ABSTRACT

A method for operating an N-level K-phase electrical power converter, wherein N is greater than or equal to 3 and K is greater than or equal to 1. The method includes: providing a plurality of N connection points that each correspond to a definable potential, wherein a first connection point corresponds to a first potential, a second connection point corresponds to a second potential, and at least one further connection point corresponds to a further potential which is lower than the first and greater than the second potential; providing a plurality of K output connections that are each selectively connected to a respective one of the connection points via at least one switching device; and having at least (Continued)

one current flowing into the at least one further connection point.

12 Claims, 4 Drawing Sheets

(58) Field of Classification Search
CPC ........ H02M 7/4835; H02M 7/42; H02M 7/44; H02M 7/487; H02M 7/49; H02M 7/515; H02M 7/538; H02M 2007/4835; H02M 2001/0025; B60L 9/22; B60L 2200/26
See application file for complete search history.

(56) References Cited

U.S. PATENT DOCUMENTS

| | | | | |
|---|---|---|---|---|
| 8,441,820 | B2* | 5/2013 | Shen | ..................... H02M 7/487 363/131 |
| 9,030,854 | B2* | 5/2015 | Escobar | ................ H02M 7/487 363/40 |
| 2006/0245216 | A1* | 11/2006 | Wu | ....................... H02M 7/487 363/13 |
| 2008/0298103 | A1 | 12/2008 | Bendre et al. | |
| 2015/0303826 | A1* | 10/2015 | Arnedo | ................. H02M 7/537 363/97 |

FOREIGN PATENT DOCUMENTS

| | | |
|---|---|---|
| EP | 0911950 A2 | 4/1999 |
| EP | 2437389 A2 | 4/2012 |

OTHER PUBLICATIONS

European Search Report and Written Opinion issued in connection with corresponding EP Application No. 14180530.9 on Aug. 4, 2015.

German Office Action dated Apr. 7, 2014 which was issued in connection with German Patent Application No. DE102013108670.5 which was filed on Aug. 9, 2013.

* cited by examiner

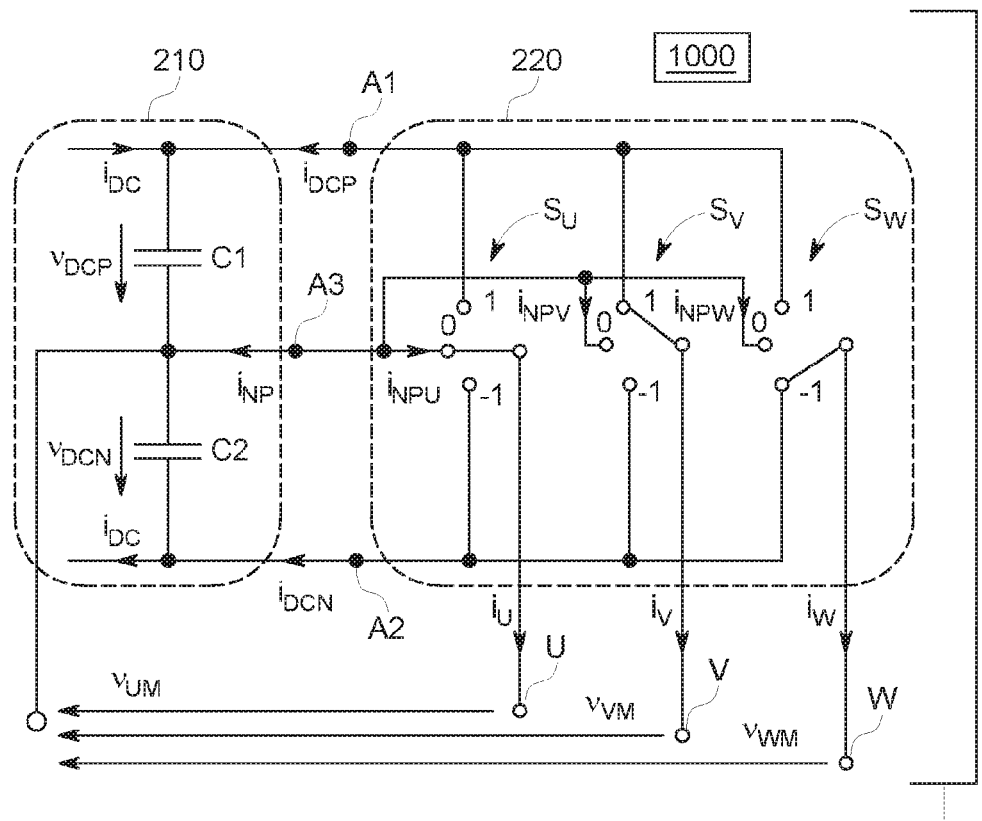
FIG. 3
FIG. 4A
FIG. 4B

METHOD AND DEVICE FOR OPERATING AN ELECTRICAL POWER CONVERTER

FIELD OF THE INVENTION

Embodiments of the present invention relate to power conversion and more particularly, to a method for operating an electrical power converter.

BACKGROUND OF THE INVENTION

Three-level and four-lever electrical power converters have been known from publication DE 10 2009 039 195 A1.

It is an object of embodiments of the present invention to improve the known operating methods and devices for operating electrical power converters in order to allow a more precise operation and, in particular, to reduce or avoid asymmetries in a DC intermediate circuit.

BRIEF DESCRIPTION OF THE INVENTION

A method for operating an N-level K-phase electrical power converter, wherein N is greater than or equal to 3, wherein K is greater than or equal to 1, wherein a plurality of N connection points are provided, which each correspond to a definable potential, wherein a first connection point corresponds to a first potential, wherein a second connection point corresponds to a second potential, and wherein at least one further connection point corresponds to a further potential which is preferably lower than the first and greater than the second potential, wherein a plurality of K output connections is provided, which can each be selectively connected to a respective one of the connection points via at least one switching device, characterized in that at least one current flowing into the at least one further connection point is influenced, in particular controlled or regulated.

A device for operating an N-level K-phase electrical power converter, wherein N is greater than or equal to 3, wherein K is greater than or equal to 1, wherein a plurality of N connection points is provided, which each correspond to a definable potential, wherein a first connection point corresponds to a first potential, wherein a second connection point corresponds to a second potential, and wherein at least one further connection point corresponds to a further potential which is preferably lower than the first and greater than the second potential, wherein a plurality of K output connections is provided, which can each be selectively connected to a respective one of the connection points via at least one switching device, characterized in that the device is configured to influence, in particular control or regulate, at least one current flowing into the at least one further connection point.

BRIEF DESCRIPTION OF THE DRAWINGS

Additional features, possibilities of use and advantages of the invention can be inferred from the description of the exemplary embodiments of the invention hereinafter, said exemplary embodiments being illustrated in the figures. In doing so, the object of the invention is represented by each of the described or illustrated examples, individually or in any combination, and independently of their summarization in the claims or their back-references as well as independently of their formulation or illustration in the description, or in the drawing. In the drawing:

FIG. 3 shows details of a further embodiment of an electrical power converter in accordance with the invention;

FIG. 4A shows a simplified flow diagram of an embodiment of the method in accordance with the invention;

FIG. 4B shows a simplified flow diagram of a further method in accordance with the invention;

DETAILED DESCRIPTION OF THE INVENTION

Figure 1:
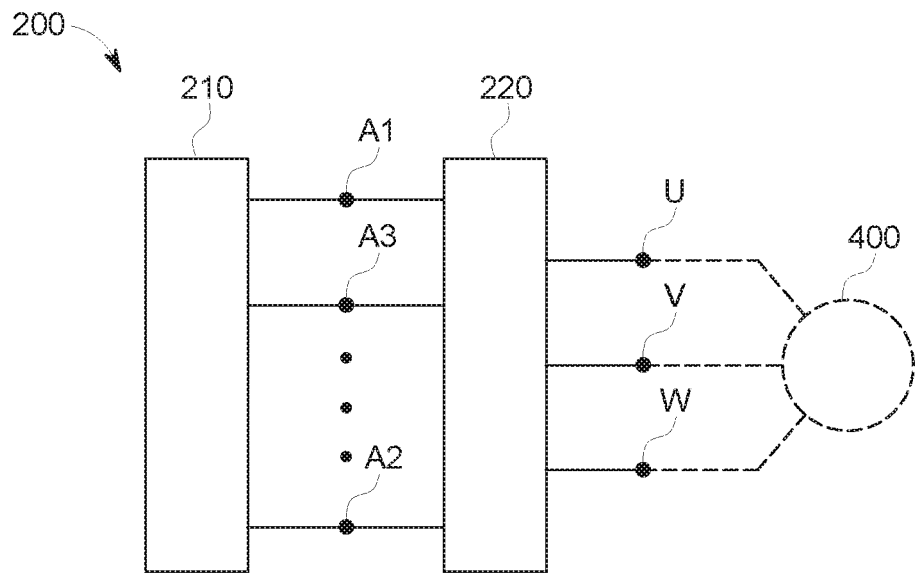
FIG. 1 shows a schematic representation of a first embodiment of an electrical power converter in accordance with the invention.

Referring to a method of an embodiment of the invention, this object is achieved in that at least one current flowing in the at least one further connection point is influenced, in particular, controlled or regulated. In electrical power converters, and in particular with DC intermediate circuits comprising capacitors, it is possible for voltage asymmetries of the capacitors to occur, commonly making available definable potentials at the plurality of N connection points. This is undesirable because such asymmetries have a negative effect on the reliability and the availability of the electrical power converter. The influencing of the at least one electrical current flowing into the at least one connection point allows for a reduction or compensation of the aforementioned asymmetries, so that a more reliable operation of the power converter becomes possible. The "current flowing into the at least one further connection point" may be positive or negative. The influencing of the respective current can be done within the framework of a control and/or regulation.

In an embodiment, the electrical power converter is a three-level (N=3), three-phase (K=3) power converter. However, the application of the principle in accordance with the invention is not restricted to three-level, three-phase electrical power converters. Embodiments of the invention can be applied to N-level electrical power converters of N>=3. Furthermore, embodiments of the invention can also be applied to electrical power converters that have a number of phases different from three phases (K=3).

Independent of the number of levels and phases of the electrical power converter, the application of embodiments of the invention make it possible that, for example, capacitor voltages of a DC intermediate circuit of the electrical power converter providing the definable potentials can be precisely maintained, so that, in particular, overvoltages in the DC intermediate circuit can be avoided. In doing so, the availability and reliability of the electrical power converter are improved.

In another embodiment, the influencing is dependent on at least one phase current of a phase and/or at least one modulation depth of a phase. Inasmuch as the phase currents and/or modulation depths in conventional methods or devices usually exist in a device controlling or regulating the operation of the electrical power converter, this allows a particularly efficient influencing within the meaning of embodiments of the present invention.

Optionally, the phase currents of the electrical power converter can also be determined in a manner known per se, for example, by metrological detection methods, whereby the corresponding values of affected phase currents are detected by a predeterminable sampling frequency. Likewise, the modulation depth of a phase of the electrical power converter in a control arrangement controlling the operation of the electrical power converter is usually known or is predetermined by a higher-level control.

For example, a modulation depth $a_U$ for a specific phase "U" may be defined as follows:

$$a_U = \begin{cases} \dfrac{t_{+1U}}{t_{+1U} + t_{0U}} & v_{UMref} > 0, \\ -\dfrac{t_{-1U}}{t_{-1U} + t_{0U}} & v_{UMref} < 0, \end{cases} \quad \text{(Equation 1)}$$

wherein, for the positive desired voltages ($v_{UMref} > 0$), it applies that $$a_U = \frac{t_{+1U}}{t_{+1U} + t_{0U}},$$

wherein $t_{+1U}$ is a time period during which a corresponding switching device having the phase "U" is connected to a first potential, and wherein $t_{0U}$ is a time period during which the switching device having the phase "U" is connected to a second potential.

With regards to negative desired voltages ($v_{UMref} < 0$), the bottom line of Equation 1 applies accordingly. In doing so, the sum of $t_{+1U}$ and $t_{0U}$ or of $t_{-1U}$ and $t_{0U}$ corresponds to a switching period TS of the electrical power converter: $TS = t_{+1U} + t_{0U}$. Analogous definitions can be developed for modulation depths of the other phases V, W of the electrical power converter.

Another embodiment provides that the influencing comprises the modifying of a desired modulation depth for at least one phase, wherein the modifying is done by adding a compensating modulation depth to the desired modulation depth for the at least one phase. It has been recognized that the provision of the compensating modulation depth allows a particularly efficient influencing of the current flowing into the at least one further connection point, because parameters (modulation depths) that have already been processed in the device need be changed only in dependence of the compensating modulation depth in order to be able to perform the influencing of a current flowing into the at least one further connection point and thus be able to achieve or maintain a symmetry. Consequently, the application of embodiments of the invention can be combined with further control strategies or regulating strategies for the electrical power converter, said strategies being likewise representable by way of a change of the modulation depth.

A further embodiment provides that the method comprise the following steps: determining possible values for a compensating modulation depth usable for modification of a desired modulation depth for at least one phase for different operating conditions of the power converter, determining an actual operating condition, preferably depending on at least one desired modulation depth and/or the compensating modulation depth, and selecting the value to be used for the compensating modulation depth.

As a result of this, a particularly precise influencing of the current flowing into the at least one further connection point is possible, said influencing allowing a reliable compensation of intermediate circuit voltage asymmetries, i.e., asymmetries of the individual capacitor voltages of a DC intermediate circuit of the electrical power converter, for example.

A further embodiment provides that, after the determining step, a limitation of the possible values of the compensating modulation depths is performed, thereby ensuring that only those compensating modulation depths are being applied that correspond to a maximum available modulation depth for the electrical power converter.

A further embodiment provides that the actual operating condition is compared with a previous operating condition and, if the actual operating condition differs from the previous operating condition, the compensating modulation depth for the actual operating condition is modified in dependence of the compensating modulation depth for the previous operating condition. As a result of this, it is possible to avoid unnecessarily frequent or rapid changes between the operating conditions of the electrical power converter.

Another embodiment provides that the step of determining possible values for the compensating modulation depth is dependent on the following equation:

$$a_0 = \begin{cases} \dfrac{a_V i_W + a_W i_V - i_{NPRef}}{2(i_V + i_W)} - a_3 & \text{for } S1, \\ \dfrac{a_U i_V + a_V i_U + i_{NPref}}{2(i_U + i_V)} - a_3 & \text{for } S2, \\ \dfrac{a_U i_W + a_W i_U - i_{NPref}}{2(i_U + i_W)} - a_3 & \text{for } S3, \\ \dfrac{a_V i_W + a_W i_V - i_{NPref}}{2(i_V + i_W)} - a_3 & \text{for } S4, \\ \dfrac{a_U i_V + a_V i_U - i_{NPref}}{2(i_U + i_V)} - a_3 & \text{for } S5, \\ \dfrac{a_U i_W + a_W i_U + i_{NPref}}{2(i_U + i_W)} - a_3 & \text{for } S6, \end{cases} \quad \text{(Equation 2)}$$

wherein $a_0$ is the compensating modulation depth, wherein $a_U$ is a desired modulation depth for a first phase "U", wherein $a_V$ is a desired modulation depth for a second phase "V", and wherein $a_W$ is a desired modulation depth for a third phase "W". Further, $i_U$ is a phase current of the first phase, $i_V$ is a phase current of the second phase, and $i_W$ is a phase current of the third phase "W". Finally, $i_{NPref}$ is a desired value for the current flowing into the at least one further connection point, wherein $a_3$ is an optional modulation depth component. Sx corresponds to an $x^{th}$ operating condition, $x = 1, \ldots, 6$.

In one embodiment, the optional modulation depth $a_3$ can be used for optimizing the voltage utilization of the electrical power converter. This can be done simultaneously with the influencing of the current flowing into the at least one further connection point. In this case, a corresponding value for $a_3$ is added to the terms of the aforementioned Equation 2.

In a simple embodiment, the optional modulation depth component $a_3$ is omitted, namely, $a_3 = 0$, thus simplifying Equation 2 accordingly:

$$a_0 = \begin{cases} \dfrac{a_V i_W + a_W i_V - i_{NPRef}}{2(i_V + i_W)} & \text{for } S1, \\ \dfrac{a_U i_V + a_V i_U + i_{NPref}}{2(i_U + i_V)} & \text{for } S2, \\ \dfrac{a_U i_W + a_W i_U - i_{NPref}}{2(i_U + i_W)} & \text{for } S3, \\ \dfrac{a_V i_W + a_W i_V + i_{NPref}}{2(i_V + i_W)} & \text{for } S4, \\ \dfrac{a_U i_V + a_V i_U - i_{NPref}}{2(i_U + i_V)} & \text{for } S5, \\ \dfrac{a_U i_W + a_W i_U + i_{NPref}}{2(i_U + i_W)} & \text{for } S6, \end{cases}$$
(Equation 2a)

This means, depending on the operating condition S1, S2, S3, S4, S5, S6 of the electrical power converter, the appropriate values for $a_0$ of Equation 2 or 2a for influencing the modulation depth are taken into consideration within the meaning of embodiments of the invention.

A further embodiment provides that the step of determining the actual operating condition is dependent on the following inequalities:

$S1: a_U + a_{03} > 0, a_V + a_{03} < 0, a_W + a_{03} < 0,$ $S2: a_U + a_{03} > 0, a_V + a_{03} > 0, a_W + a_{03} < 0,$ $S3: a_U + a_{03} < 0, a_V + a_{03} > 0, a_W + a_{03} < 0,$ $S4: a_U + a_{03} < 0, a_V + a_{03} > 0, a_W + a_{03} > 0,$ $S5: a_U + a_{03} < 0, a_V + a_{03} < 0, a_W + a_{03} > 0,$ $S6: a_U + a_{03} > 0, a_V + a_{03} < 0, a_W + a_{03} > 0,$ (Equation 3)

wherein $a_{03} = a_0 + a_3$.

If, however, on account of a particularly preferred embodiment, the optional modulation depth component $a_3$ is omitted, i.e. $a_3 = 0$, this also simplifies Equation 3 accordingly:

$S1: a_U + a_0 > 0, a_V + a_0 < 0, a_W + a_0 < 0,$ $S2: a_U + a_0 > 0, a_V + a_0 > 0, a_W + a_0 < 0,$ $S3: a_U + a_0 < 0, a_V + a_0 > 0, a_W + a_0 < 0,$ $S4: a_U + a_0 < 0, a_V + a_0 > 0, a_W + a_0 > 0,$ $S5: a_U + a_0 < 0, a_V + a_0 < 0, a_W + a_0 > 0,$ $S6: a_U + a_0 > 0, a_V + a_0 < 0, a_W + a_0 > 0,$ (Equation 3a)

This means, if the inequalities $a_U + a_0 > 0$, $a_V + a_0 < 0$, $a_W + a_0 < 0$ of line one of Equation 3 or 3a are true, it may be concluded that the electrical power converter is in the operating condition "S1", etc.

A further embodiment provides that a DC intermediate circuit be provided, said circuit comprising, between the first connection point and the second connection point, a series circuit comprising a number of (N−1) capacitors, wherein, the further connection point is a junction at which a $j^{th}$ capacitor of the series circuit is connected to a $(j+1)^{th}$ capacitor of the series circuit, wherein $1 \leq j \leq N-2$.

Another object of the present invention is a device for operating an electrical power converter in accordance with claim 10. Additional embodiments are the subject matter of the dependent claims.

FIG. 1 shows an electrical power converter 200 in accordance with a first embodiment. The electrical power converter 200 is configured as an N-level power converter, wherein N>=3. Accordingly, a number of N connection points A1, A2, A3, etc, are provided, wherein FIG. 1 explicitly shows and depicts only the first three connection points. In a manner known per se, respectively one predefinable potential is made available at the connection points A1, A2, A3, etc. A switching device 220 of the electrical power converter 220 is connected on the input side to the connection points A1, A2, A3, etc., and is able to selectively connect a number of K output connections (herein K=3) U, V, W to respectively one of the connection points A1, A2, A3, . . . . In this manner it is possible, by appropriate control of the switching device 220, to make available a prespecifiable voltage form on the output connections U, V, W, resulting from the individual values of the predefinable potentials of the connection points A1, A2, A3, etc.

A load 400 is shown in dashed lines as an example in FIG. 1, said consumer being supplied by the power converter 200 with electrical energy having a prespecifiable current and voltage form. The load 400 may be, for example, a three-phase motor or the like.

A first connection point A1 of the power converter 200 corresponds to a first potential, e.g., a positive supply voltage $+V_{DC}$. As opposed to this, a second connection point A2 corresponds to a second predefinable potential, e.g., a negative supply voltage $-V_{DC}$. The at least one further connection point A3 corresponds to a further potential that, preferably, is smaller than the first potential of the first connection point A1 and is greater than the second potential of the second connection point A2. For example, the potential assigned to the third connection point A3 may correspond to a zero potential. In particular, in one embodiment, e.g., the first potential $+V_{DC}$ of the connection point A1 may be approximately 200 V, while the second potential $-V_{DC}$ of the second connection point A2 may be approximately −200 V, and the third potential of the third connection point A3 may be 0 V.

Additional connection points not shown in FIG. 1 may, accordingly, be assigned other potentials.

It is intended that at least one current flowing into the at least one further connection point A3 (or flowing out of the at least one further connection point A3) is influenced in order to eliminate or attenuate asymmetries in the DC voltage sources of the DC intermediate circuit 210 that might potentially occur during operation of the electrical power converter. In particular, if the DC intermediate circuit 210 comprises a series connection of capacitors for making available various potentials assigned to the connection points A1, A2, A3, etc., such influencing of the current flowing into the connection point A3 is based on the applicant's investigations, because asymmetries in the DC intermediate circuit 210 can be reduced or completely compensated for. As a result of this, a precise allocation of electrical energy and, in particular, the excitation of the load 400 with predefinable voltage values or with a chronological progression of the voltage are facilitated.

Figure 2:
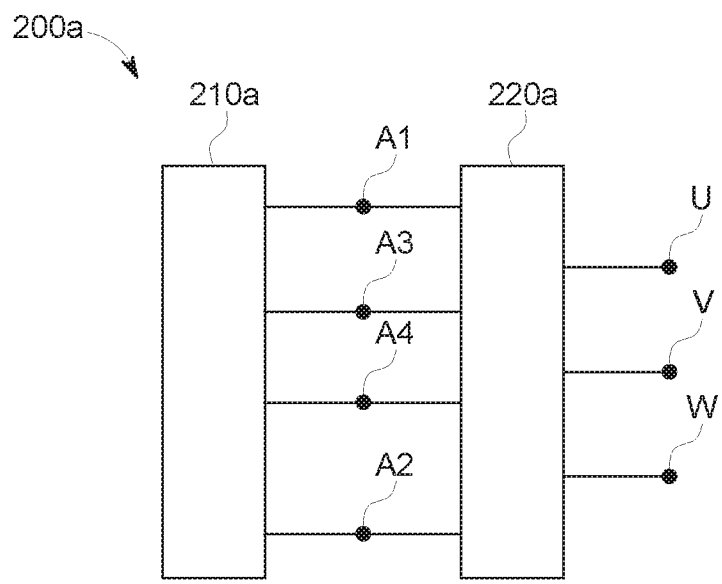
FIG. 2 shows a schematic representation of a further embodiment of an electrical power converter in accordance with the invention.

FIG. 2 shows an extended embodiment 200a of the electrical power converter in accordance with an embodiment of the invention, said power converter being configured here as a four-level (N=4) power converter and, accordingly comprising four connection points A1, A2, A3, A4 with different potentials. The respective potentials are provided by the DC intermediate circuit 210a that in an embodiment, in turn, may comprise a series circuit of capacitors (not shown). A switching device 220a selectively connects the different output connections U, V, W of the electrical power converter 200a to the connection points A1, A2, A3, A4.

Referring to the present embodiment 200a in accordance with FIG. 2, embodiments of the invention can be applied to a current flowing though the connection point A3 or a current flowing through the connection point A4. A consideration or influencing of both currents in the two connection points A3, A4 is also possible.

FIG. 3 shows a further embodiment of the invention. Depicted is a simplified equivalent circuit of a three-level (N=3), three-phase (K=3) electrical power converter that comprises a DC intermediate circuit 210 and a switching device 220. The DC intermediate circuit 210 comprises a first capacitor C1, as well as, serially connected thereto, a second capacitor C2. A first connection point A1 is connected to the upper connection of the first capacitor in FIG. 3, a second connection point A2 is connected to the lower connection of the second capacitor C2 in FIG. 3, and a third connection point A3 is connected to the junction that connects the lower connection of the first capacitor C1 of FIG. 3 to the upper connection of the second capacitor C2 of FIG. 3.

The switching device 220 comprises a total of three switches $S_U$, $S_V$, $S_W$, that may be configured in a manner known per se, e.g., as semiconductor switches. Each of the three switches $S_U$, $S_V$, $S_W$ features three switch positions that are marked here "1", "−1", "0" in FIG. 3. Considering the operating condition shown in FIG. 3, e.g., the first switch $S_U$ is in switch position "0" in which the first output connection U of the power converter is connected to the third connection point A3 of the DC intermediate circuit 210. The second switch $S_V$ here is in the switch position "1" that connects the second output connection V to the connection point A1 of the DC intermediate circuit 210. The third switch $S_W$ presently is in switch position "−1", so that the output connection W of the power converter in accordance with FIG. 3 is connected to the second connection A2 of the DC intermediate circuit 210.

The switches $S_U$, $S_V$, $S_W$ or their switch positions can be controlled by the device 1000 for controlling the electrical power converter in a manner known per se. To accomplish this, the device 1000 may have at its disposal a computing unit such as, e.g., a microcontroller and/or a digital signal processor (DSP), or may also make at least partial use of programmable logic modules (FPGA—field programmable gate array) or may also be implemented as an ASIC (application specific integrated circuit).

For the operation of the electrical power converter shown by FIG. 3, the DC intermediate circuit 210 is supplied with a supply voltage (direct voltage)—compare also supply current $i_{DC}$—in a manner known per se, by an external source (not shown) at the connection points A1, A2, so that the corresponding partial voltages $v_{DCP}$, $v_{DCN}$ occur over the capacitors C1, C2. If the capacitance values for the capacitors C1, C2 are the same, the partial voltages $v_{DCP}$, $v_{DCN}$, accordingly, are initially the same.

During the operation of the electrical power converter in accordance with FIG. 3, a non-disappearing electrical center current $i_{NP}$ into the third connection point A3 may result, in particular when at least one of the switches $S_U$, $S_V$, $S_W$ is in the switch position "0". Due to this electrical center current $i_{NP}$, the voltage distribution of the capacitors C1, C2 changes in such a manner that the partial voltages $v_{DCP}$, $v_{DCN}$ no longer have the same values. This phenomenon, also referred to as intermediate circuit voltage asymmetry, may cause the permissible intermediate voltage to be exceeded and is thus undesirable. Further, due to this, the voltage zero point (here the potential of the switching junction A3) may shift with the result that that the voltage values available on the output side at the output connections U, V, W for generating an alternate voltage are considerably different from the desired reference voltage values.

Accordingly, embodiments of the invention provide for the influencing of the current flowing into the third connection point A3, herein also referred to as the electrical center current $i_{NP}$, as a result of which the intermediate circuit voltage asymmetry can be reduced or compensated for.

In other words, the electrical power converter 200 is operated by applying embodiments of the invention in such a manner that the electrical center current $i_{NP}$ can be influenced—in particular with the objective of completely compensating for the electrical center current, i.e., $i_{NP}=0$. Alternatively, by applying embodiments of the invention, the electrical center current can also be adjusted or regulated to predefinable non-disappearing values, i.e., $i_{NP}< >0$.

In modifications of the electrical power converter with more than one "internal" connection point A3, A4, etc. (FIG. 2), the phenomenon described hereinabove may also occur and also be reduced by the appropriate use of the method of the invention herein. However, for the sake of clarity, the description hereinafter makes reference to the embodiment in accordance with FIG. 3.

FIG. 4A shows a simplified flow diagram of a first embodiment of the method in accordance with the invention. In a first step 300, the operating parameters of the power converter 200 are detected (FIG. 1) and, in a subsequent step 310, at least one current $i_{NP}$ flowing into an at least one further connection point A3 (FIG. 3) is influenced, in particular by means of a control and/or regulation.

FIG. 4B shows a flow diagram of a further embodiment of the method in accordance with the invention. Before discussing the steps 400 to 430 in detail, a few operating parameters of the power converter of FIG. 3, as well as additional preferred embodiments, are described first hereinafter.

One embodiment provides that both partial intermediate circuits of the DC intermediate circuit 210 be supplied with a shared direct current $i_{DC}$. FIG. 3 shows that, if in one of the three switching devices $S_U$, $S_V$, $S_W$, a zero state (switch position "0") is activated, the associate load current or phase current $i_U$, $i_V$, $I_W$ flows into or out of the electrical converter center represented by the junction A3. This causes a non-disappearing voltage difference $v_{DCP}-v_{DCN}$ or an asymmetry of the capacitor voltages $v_{DCP}$, $v_{DCN}$. The electrical center current $i_{NP}$ at this moment is $$i_{NP} = -i_{NPU} - i_{NPV} - i_{NPW}, \qquad \text{(Equation 4.1)},$$

wherein $$i_{NPU} = \begin{cases} i_U & \text{for } S_U = 0 \\ 0 & \text{otherwise,} \end{cases} \qquad \text{(Equation 4.2)},$$

$$i_{NPV} = \begin{cases} i_V & \text{for } S_V = 0 \\ 0 & \text{otherwise,} \end{cases}$$

$$i_{NPW} = \begin{cases} i_W & \text{for } S_W = 0 \\ 0 & \text{otherwise} \end{cases},$$

wherein "$S_U=0$" means that the switching device SU is in the switch position "0", etc.

In accordance with one embodiment, the switch positions "0", "−1", "1" are changed, for example in the sense of a pulse width modulation. That is, depending on the desired output voltage corresponding switch positions "0", "−1", "1" are adjusted or maintained for the individually predeterminable time. The desired output voltage of the electrical power converter 200 for the phase U results, for example, from $$v_{UM} = \begin{cases} v_{DCP} & \text{for } S_U = 1, \\ 0 & \text{for } S_U = 0, \\ -v_{DCN} & \text{for } S_U = -1, \end{cases} \quad \text{(Equation 4.3),}$$

and the voltages $v_{VM}$, $v_{WM}$ result analogously. The desired output voltages $v_{UM}$, $v_{VM}$, $v_{WM}$ are realized as chronological mean values over a switching period TS. In one embodiment, positive output voltages between the values $v_{DCP}$ and zero can thus be set by $$v_{UM,mean} = \frac{t_{+1U}}{t_{+1U} + t_{0U}} v_{DCP}, \quad \text{(Equation 5.1),}$$

with $TS = t_{+1U} + t_{0U}$, negative values of the output voltage between zero and $v_{DCN}$ are set by $$v_{UM,mean} = -\frac{t_{-1U}}{t_{-1U} + t_{0U}} v_{DCN}, \quad \text{(Equation 5.2),}$$

with $TS = t_{-1U} + t_{0U}$, wherein $t_{+1U}$ indicates the time period within a switching period TS during which the switching device $S_U$ assumes the switch position "1", wherein $t_{-1U}$ indicates the time period within a switching period TS during which the switching device $S_U$ assumes the switch position "−1", and wherein $t_{0U}$ indicates the time period within a switching period TS during which the switch device $S_U$ assumes the switch position "0". This applies, analogously, to the other switching devices $S_V$, $S_W$.

In accordance with one embodiment, the modulation depth $a'_U$ for the phase U is defined as $$a'_U = \begin{cases} \dfrac{t_{+1U}}{t_{+1U} + t_{0U}} & v_{UMref} > 0, \\ -\dfrac{t_{-1U}}{t_{-1U} + t_{0U}} & v_{UMref} < 0, \end{cases} \quad \text{(Equation 6.1),}$$

wherein $v_{UMref}$ is a desired output voltage for the phase U.

In both cases the switch position $S_U = 0$ is active during the period $t_{0U}$.

The modulation depths $a'_V$, $a'_W$ of the remaining phases V, W result analogously:

$$a'_V = \begin{cases} \dfrac{t_{+1V}}{t_{+1V} + t_{0V}} & v_{VMref} > 0, \\ -\dfrac{t_{-1V}}{t_{-1V} + t_{0V}} & v_{VMref} < 0, \end{cases} \quad \text{(Equation 6.2),}$$

$$a'_W = \begin{cases} \dfrac{t_{+1W}}{t_{+1W} + t_{0W}} & v_{WMref} > 0, \\ -\dfrac{t_{-1W}}{t_{-1W} + t_{0W}} & v_{WMref} < 0, \end{cases} \quad \text{(Equation 6.3),}$$

wherein $v_{VMref}$ is a desired output voltage for phase V, and wherein $v_{WMref}$ is a desired output voltage for phase W.

Therefore:

$$\frac{t_{0U}}{T_S} = \begin{cases} \dfrac{t_{0U}}{t_{+1U} + t_{0U}} & a'_U > 0 \\ \dfrac{t_{0U}}{t_{-1U} + t_{0U}} & a'_U < 0 \end{cases} \quad \text{(Equation 7.1),}$$

$$= \begin{cases} 1 - a'_U & a'_U > 0 \\ 1 + a'_U & a'_U < 0 \end{cases}$$

$$= 1 - a'_U \text{sgn}(a'_U)$$

$$= 1 - |a'_U|,$$

wherein sgn(x) is the signum function (sign function) of x, and wherein |x| is the absolute value of x.

Analogously the following applies:

$$t_{0V}/TS = 1 - |a'_V| \quad \text{(Equation 7.2)}$$

as well as $$t_{0W}/TS = 1 - |a'_W| \quad \text{(Equation 7.3).}$$

In accordance with one embodiment, the electrical center current $i_{NP}$ averaged over a switching period TS can be expressed by $$a'_U = a_U + a_0 + a_3, \quad \text{(Equation 8.1)}$$

$$a'_V = a_V + a_0 + a_3, \quad \text{(Equation 8.2)}$$

$$a'_W = a_W + a_0 + a_3 \quad \text{(Equation 8.3)}$$

with $$i_{NP,mean} = (1 - |a_U + a_0 + a_3|)i_U - (1 - |a_V + a_0 + a_3|)i_V - (1 - |a_W + a_0 + a_3|)i_W \quad \text{(Equation 9)}$$

wherein $a_U$, $a_V$, $a_W$ are the phase modulation depths of phases U, V, W, and wherein $a_0$ is the compensating modulation depth in accordance with an embodiment of the invention, said compensating modulation depth corresponding to a zero component necessary for the regulation of the intermediate circuit symmetry. This means, by influencing, e.g., by adding the compensating modulation depth $a_0$ to the modulation depth $a'_U$, it is possible to influence the mean electrical center current $i_{NP,mean}$ (the same applies to the other parameters $a'_V$, $a'_W$).

The term "$a_3$" in the equations hereinabove is a common-mode component of the third harmonic that can be utilized for an enhanced voltage utilization of the power converter. To do so, the value of $a_3$ must be selected accordingly. However, the use of $a_3$ is purely optional. In particular, it is possible to perform the influencing of the current $i_{NP}$ flowing into or out of the connection point A3 (FIG. 3) without taking into consideration the term $a_3$, namely with the use of the compensating modulation depth $a_0$. In this case, $a_3 = 0$ can be selected in such a manner that Equation 9 is simplified as follows:

$$i_{NP,mean} = -(1 - |a_U + a_0|)i_U - (1 - |a_V + a_0|)i_V - (1 - |a_W + a_0|)i_W \quad \text{(Equation 9.1).}$$

For the description hereinafter, the optionally usable term $a_3$—without general limitations—will however be mostly employed in the following equations. If an increased voltage utilization of the electrical power converter is not desired, but, rather, only the influencing of the current flowing into or out of the connection point A3 (FIG. 3) with the use of the compensating modulation depth $a_0$, the term $a_3$ can simply be set to zero in the respective equations.

Based on the above equations, a dynamic model of partial intermediate circuit voltages $V_{DCP}$, $V_{DCN}$ can be described by $$\frac{d}{dt}\begin{pmatrix} V_{DCP} \\ V_{DCN} \end{pmatrix} = \frac{1}{2C_{DC}}\begin{pmatrix} i_{DCP} \\ -i_{DCN} \end{pmatrix} + \frac{1}{2C_{DC}}\begin{pmatrix} i_{DC} \\ i_{DC} \end{pmatrix} \quad \text{(Equation 10)}$$

herein $C1=2C_{DC}$, $C2=2C_{DC}$, i.e., the capacitance values of the capacitors C1, C2 of FIG. 3 correspond, respectively, to double the reference capacity $C_{DC}$ as in Equation 10.

With Kirchhoff's current law, the following is applicable to the connection point A3:

$$i_{DCP} + i_{DCN} + i_{NP} = 0 \quad \text{(Equation 11)},$$

as well as with $$i_{DCP} = a'_U i_U + a'_V i_V + a'_W i_W \quad \text{(Equation 12)}$$

and with an applicable assumption—with a not connected neutral point of the load 400 (FIG. 1)

$$0 = i_U + i_V + i_W \quad \text{(Equation 13)}$$

it follows for the difference of the intermediate circuit voltages $\Delta u_{DC}$ $$\begin{aligned}\frac{d}{dt}\Delta u_{DC} &= \frac{d}{dt}(u_{DCP} - u_{DCN}) \quad \text{(Equation 14.1)}\\ &= i_{DCP} + i_{DCN}\\ &= -i_{NP}\\ &= (|a_U + a_0 + a_3|)i_U + (|a_V + a_0 + a_3|)i_V +\\ &\quad (|a_W + a_0 + a_3|)i_W.\end{aligned}$$

For the case of compensation without a simultaneously increased voltage utilization, the following results with $a_3=0$:

$$\begin{aligned}\frac{d}{dt}\Delta u_{DC} &= \frac{d}{dt}(u_{DCP} - u_{DCN}) \quad \text{(Equation 14.2)}\\ &= i_{DCP} + i_{DCN}\\ &= -i_{NP}\\ &= (|a_U + a_0|)i_U + (|a_V + a_0|)i_V +\\ &\quad (|a_W + a_0|)i_W.\end{aligned}$$

In accordance with one embodiment, the algorithm of influencing, in particular control, of the electrical center current $i_{NP}$ (FIG. 3) is derived from Equations 9 and 9.1, respectively. Inasmuch as the electrical center current $i_{NP}$ is a function of the absolute values $|a_U+a_0+a_3|$, $|a_V+a_0+a_3|$, $|a_W+a_0+a_3|$ of the phase modulation depths, preferably a difference is made among seven cases for the description of the required common-mode component as a function of the electrical center current. Depending on the sign of the phase modulation depths, the electrical center current is $$i_{NP,mean} \begin{cases} a_V i_W + a_W i_V - 2(a_0 + a_3)(i_V + i_W) \text{ for} & \text{(Equation 15)}\\ a_U + a_{03} > 0, a_V + a_{03} < 0, a_W + a_{03} < 0,\\ -a_U i_V - a_V i_U + 2(a_0 + a_3)(i_U + i_V) \text{ for}\\ a_U + a_{03} > 0, a_V + a_{03} > 0, a_W + a_{03} < 0,\\ a_U i_W + a_W i_U - 2(a_0 + a_3)(i_U + i_W) \text{ for}\\ a_U + a_{03} < 0, a_V + a_{03} > 0, a_W + a_{03} < 0,\\ -a_V i_W - a_W i_V + 2(a_0 + a_3)(i_V + i_W) \text{ for}\\ a_U + a_{03} < 0, a_V + a_{03} > 0, a_W + a_{03} > 0,\\ a_U i_V + a_V i_U - 2(a_0 + a_3)(i_U + i_V) \text{ for}\\ a_U + a_{03} < 0, a_V + a_{03} < 0, a_W + a_{03} > 0,\\ -a_U i_W - a_W i_U + 2(a_0 + a_3)(i_U + i_W) \text{ for}\\ a_U + a_{03} > 0, a_V + a_{03} < 0, a_W + a_{03} > 0,\\ a_U i_U + a_V i_V + a_W i_W \text{ for}\\ a_U + a_{03} > 0, a_V + a_{03} > 0, a_W + a_{03} > 0,\\ -a_U i_U - a_V i_V - a_W i_W \text{ for}\\ a_U + a_{03} < 0, a_V + a_{03} < 0, a_W + a_{03} < 0, \end{cases}$$

wherein $a_{03}=a_0+a_3$. The law governing midpoint voltage regulation can be found by solving Equation 15 for $a_0$: If the sectors $$S1: a_U+a_{03}>0, a_V+a_{03}<0, a_W+a_{03}<0,$$

$$S2: a_U+a_{03}>0, a_V+a_{03}>0, a_W+a_{03}<0,$$

$$S3: a_U+a_{03}<0, a_V+a_{03}>0, a_W+a_{03}<0,$$

$$S4: a_U+a_{03}<0, a_V+a_{03}>0, a_W+a_{03}>0,$$

$$S5: a_U+a_{03}<0, a_V+a_{03}<0, a_W+a_{03}>0,$$

$$S6: a_U+a_{03}>0, a_V+a_{03}<0, a_W+a_{03}>0, \quad \text{(Equation 16)}$$

are defined, the compensating modulation depth $a_0$, said modulation depth corresponding to a common-mode component for balancing the DC intermediate circuit, is calculated to $$a_0 = \begin{cases} \frac{a_V i_W + a_W i_V - i_{NPRef}}{2(i_V + i_W)} - a_3 & \text{for } S1, \\ \frac{a_U i_V + a_V i_U + i_{NPref}}{2(i_U + i_V)} - a_3 & \text{for } S2, \\ \frac{a_U i_W + a_W i_U - i_{NPref}}{2(i_U + i_W)} - a_3 & \text{for } S3, \\ \frac{a_V i_W + a_W i_V + i_{NPref}}{2(i_V + i_W)} - a_3 & \text{for } S4, \\ \frac{a_U i_V + a_V i_U - i_{NPref}}{2(i_U + i_V)} - a_3 & \text{for } S5, \\ \frac{a_U i_W + a_W i_U + i_{NPref}}{2(i_U + i_W)} - a_3 & \text{for } S6, \\ \text{any} & \text{otherwise.} \end{cases} \quad \text{(Equation 17)},$$

wherein $I_{NPref}$ is a desired value for the electrical center current $i_{NP}$.

Figure 5A:
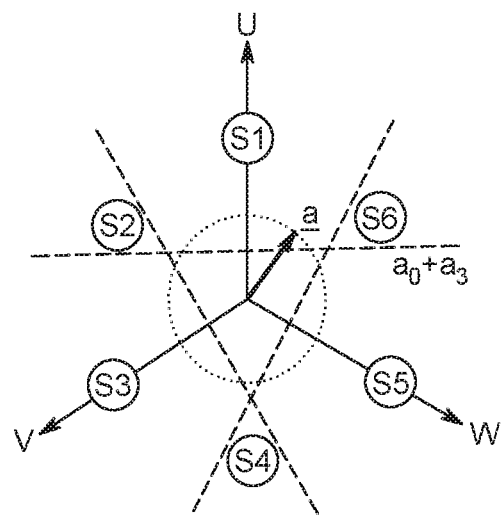
FIG. 5A shows a diagram illustrating an operating condition of an electrical power converter according to an embodiment of the invention.
Figure 5B:
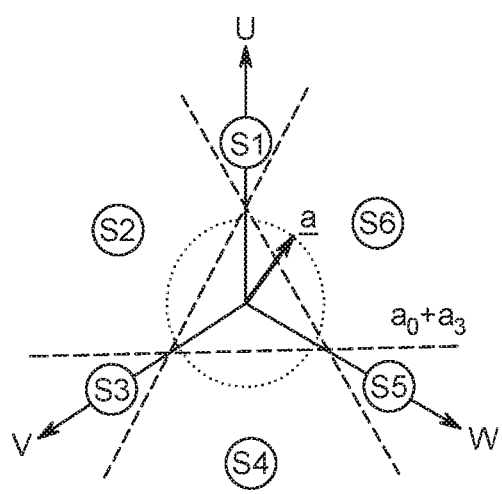
FIG. 5B shows a diagram illustrating an operating condition of an electrical power converter according to an embodiment of the invention.

A splitting of the different operating conditions S1, S2, S3, S4, S5, S6 of the electrical power converter 200 (FIG. 1) in accordance with one embodiment is shown by FIGS. 5A, 5B.

The sectors corresponding to the six different operating conditions 51, S2, S3, S4, S5, S6, in which influencing of the midpoint voltage or the current $i_{NP}$ is possible, are arranged centered to the coordinate axes of a UVW coordinate system corresponding to the phases U, V, W. Depending on the common-mode signal, the sector boundaries shift along the UVW-axes. In conjunction with this it must be noted that (assuming $i_U+i_V+i_W=0$) two cases remain ($a_U+a_{03}>0$, $a_V+a_{03}>0$, $a_W+a_{03}>0$, FIG. 5A, as well as $a_U+a_{03}>0$, $a_V+a_{03}>0$, $a_W+a_{03}>0$, FIG. 5B), in which the electrical center current $i_{NP}$ is only a function of the phase modulation depths and currents and cannot be influenced by common-mode signals.

In an embodiment, use is made of the fact that the variable $i_{NPref}$ in Equation 17 provides a degree of freedom for influencing, in particular regulating, the intermediate circuit voltage difference. In other words, the desired electrical center current $i_{NPref}$ can be predefined, e.g., $i_{NPref}=0$, and the Equation 17 can then be used for determining the compensating modulation depth $a_0$ that is to be used for the control or regulation of the electrical power converter 200 in order to adjust the desired electrical center current $i_{NPref}$. As a result of this, it is possible to reduce or even compensate for any inaccuracies in the operation of the electrical power converter, which occur due to not accurately known electrical center currents, e.g., caused by an asymmetrical load or the electrical center current of the mains power converter. Therefore, with the application of the compensating modulation depth $a_0$, it is possible, among other things, to prevent the capacitor voltages $v_{DCP}$, $v_{DCN}$ (FIG. 3) from assuming values that differ from each other.

In an embodiment, the desired value $i_{NPref}$ for the electrical center current as the output parameter of a PI regulator regulating a relatively slowly changing component of the intermediate circuit voltage difference to zero can be obtained:

$$i_{NPref}=K_P\Delta u_{DC}-K_I\int\Delta u_{DC}d\tau \qquad \text{(Equation 18)},$$

wherein $\Delta u_{DC}=v_{DCP}-v_{DCN}$, and wherein $K_P$, $K_I$ are constants of the PI regulator known per se, and wherein d'r represents a time differential.

FIG. 4B shows a flow diagram of a further embodiment of a method in accordance with the invention. In a first step 400, possible values for a compensating modulation depth $a_0$ usable for the modification of a desired modulation depth $a_U$, $a_V$, $a_W$ for at least one phase are determined for different operating conditions S1, S2, S3, S4, S5, S6 of the electrical power converter 200.

In an embodiment, in step 400, an appropriate compensating modulation depth $a_0$ is determined for all the possible operating conditions S1, S2, S3, S4, S5, S6 of the electrical power converter 200, said compensating modulation depth being used for adjusting a desired electrical center current $i_{NPref}$. This is accomplished with an embodiment with Equation 17—at least for a few of the possible operating conditions S1, S2, S3, S4, S5, S6.

In so far as the optional parameter $a_3$ for the enhanced utilization of the voltage is not used, Equation 17 is simplified to:

$$a_0 = \begin{cases} \frac{a_V i_W + a_W i_V - i_{NPRef}}{2(i_V + i_W)} & \text{for } S1, \\ \frac{a_U i_V + a_V i_U + i_{NPref}}{2(i_U + i_V)} & \text{for } S2, \\ \frac{a_U i_W + a_W i_U - i_{NPref}}{2(i_U + i_W)} & \text{for } S3, \\ \frac{a_V i_W + a_W i_V + i_{NPref}}{2(i_V + i_W)} & \text{for } S4, \\ \frac{a_U i_V + a_V i_U - i_{NPref}}{2(i_U + i_V)} & \text{for } S5, \\ \frac{a_U i_W + a_W i_U + i_{NPref}}{2(i_U + i_W)} & \text{for } S6, \\ \text{any} & \text{otherwise.} \end{cases} \qquad \text{(Equation 17.1)}$$

According to an embodiment, the desired electrical center current $i_{NPref}$ shall assume the value of zero, i.e., $i_{NPref}=0$, so that Equation 17.1 is further simplified to:

$$a_0 = \begin{cases} \frac{a_V i_W + a_W i_V}{2(i_V + i_W)} & \text{for } S1, \\ \frac{a_U i_V + a_V i_U}{2(i_U + i_V)} & \text{for } S2, \\ \frac{a_U i_W + a_W i_U}{2(i_U + i_W)} & \text{for } S3, \\ \frac{a_V i_W + a_W i_V}{2(i_V + i_W)} & \text{for } S4, \\ \frac{a_U i_V + a_V i_U}{2(i_U + i_V)} & \text{for } S5, \\ \frac{a_U i_W + a_W i_U}{2(i_U + i_W)} & \text{for } S6, \\ \text{any} & \text{otherwise.} \end{cases} \qquad \text{(Equation 17.2)}$$

This means that, for the possible operating condition S1 of the electrical power converter 200, Equation 17.2 provides, for the adjustment of a desired electrical center current of zero and without the use of the parameter $a_3$ for increased voltage utilization, a compensating modulation depth $$a_0 = \frac{a_V i_W + a_W i_V}{2(i_V + i_W)},$$

and for the possible operating condition S2, a compensating modulation depth $$a_0 = \frac{a_U i_V + a_V i_U}{2(i_U + i_V)},$$

and so forth.

In accordance with one embodiment, the values for the compensating modulation depths determined with Equation 17.2 are also referred to as "zero sequence candidates." Consequently, after performing step 400, the different values ("zero sequence candidates") are available for the compensating modulation depth under the possible operating conditions S1, S2, S3, S4, S5, S6.

Subsequently, the optional step 410 may be performed, said step relating to the subject matter of limiting the possible values of the compensating modulation depth $a_0$. In particular, the limitation may provide that the different values ("zero sequence candidates") for the compensating modulation depth under the possible operating conditions 51, S2, S3, S4, S5, S6 be checked as to whether they exceed a maximum available modulation depth. In this case, this compensating modulation depth cannot go through the appropriate electrical power converter at all and is thus not available for controlling the electrical power converter.

In one embodiment, the limiting operation according to the optional step 410 can be performed using the following inequality:

$$-a_{max}-\min(a_U+a_3,a_V+a_3,a_W+a_3)<a_0(S1 \ldots S6)<a_{max}-\max(a_U+a_3,a_V+a_3,a_W+a_3), \qquad \text{(Inequality 18)}$$

wherein $a_0(S1 \ldots S6)$ represent the zero sequence candidates in accordance with Equation 17.2. With $a_3=0$, the Inequality 18 is simplified to:

$$-a_{max}-\min(a_U,a_V,a_W)<a_0(S1 \ldots S6)<a_{max}-\max(a_U,a_V,a_W), \qquad \text{(Inequality 18.1)}$$

wherein $a_0$ (S1 ... S6) represent the zero sequence candidates in accordance with Equation 17.2 and $a_{max}$ is the maximum permissible level of modulation. This means, in order to satisfy the limitation in accordance with a preferred embodiment of the optional step 410, the zero sequence candidate must be smaller than the available modulation reserve, whose limits are given by the inequalities hereinabove.

In other words, after performing the optional step 410, those different values ("zero sequence candidates") are available for the compensating modulation depth under the possible operating conditions 51, S2, S3, S4, S5, S6 that satisfy the limitation criterion as described hereinabove as an example. For example, it is conceivable that the compensating modulation depth $a_0$ for the operating conditions 51, S2, S3 satisfy the limitation criterion in accordance with step 410 and are available for the continuing process flow, while the compensating modulation depths $a_0$ for the operating conditions S4, S5, S6 are smaller than the predefinable minimum or greater than the predefinable maximum of limitation and hence are no longer available for the continuing process flow.

As an alternative to a limiting operation in accordance with step 410, it is also possible to go from step 400 directly to step 420. In conjunction with this, it is potentially necessary to accept a setting error that results from the fact that a compensating modulation depth that is potentially selected later for controlling the electrical power converter cannot be provided by the power converter at all.

In step 420, an actual operating condition of the electrical power converter 200 is determined, preferably as a function of at least one desirable modulation depth $a_U$, $a_V$, $a_W$ and/or the compensating modulation depth $a_0$. The actual operating condition can be determined, for example, by evaluating Equation 16.

If, due to a particularly preferred embodiment, the optional modulation depth component $a_3$ is omitted, namely, $a_3=0$, Equation 16 accordingly simplifies to:

$$S1: a_U+a_0>0, a_V+a_0<0, a_W+a_0<0,$$

$$S2: a_U+a_0>0, a_V+a_0>0, a_W+a_0<0,$$

$$S3: a_U+a_0<0, a_V+a_0>0, a_W+a_0<0,$$

$$S4: a_U+a_0<0, a_V+a_0>0, a_W+a_0>0,$$

$$S5: a_U+a_0<0, a_V+a_0<0, a_W+a_0>0,$$

$$S6: a_U+a_0>0, a_V+a_0<0, a_W+a_0>0, \quad \text{(Equation 16.1)}$$

This means that, if, e.g., the inequalities $a_U+a_0>0$, $a_V+a_0<0$, $a_W+a_0<0$ of line one of Equation 16.1 are true, it can then be concluded that the power converter is actually in the operating condition "S1", etc.

For example, the evaluation of Equation 16.1 in step 420 (FIG. 4B) may show that the electrical power converter 200 is actually in the operating condition S2 because, as a function of the actual values for the modulation depths, the inequality $a_U+a_0>0$, $a_V+a_0>0$, $a_W+a_0>0$ is satisfied.

Subsequently, in step 430, the value to be used for the compensating modulation depth $a_0$ is selected, wherein the selection is preferably made from the zero sequence candidates determined in step 400. If the optimal limiting is done consistent with step 410, then, in step 430, the selection is made from the quantity of zero sequence candidates remaining at the end of step 410.

In accordance with the aforementioned example, a limiting is performed in step 410 in such a manner that the zero sequence candidates for the operating conditions S1, S2, S3 satisfy the limiting criterion in accordance with step 410 and are available for the continuing method flow and are thus available for the selection in accordance with step 430. Consequently, a selection is possible from among the values for the compensating modulation depth for the operating conditions S1, S2, S3.

Inasmuch as step 420 showed that the electrical power converter 200 is actually in the operating condition S2, the compensating modulation depth corresponding to the actual operating condition is used to subsequently drive the power converter 200, said drive controlling in particular the switches $S_U$, $S_V$, $S_W$ (position, durations of the respective switch position), as a result of which it is possible, in a particularly manner, to omit switching condition changes of the switching device 220.

In so far as, for the selection in step 430 (optionally after the completed limitation in accordance with step 410), no actual compensating modulation depth corresponding to the actual operating condition is available (e.g., due to the limitation), it is possible, for a subsequent drive of the power converter 200, to select, e.g., such a compensating modulation depth that corresponds to an operating condition that requires the least possible changes of the switch positions of the switching device 220.

Figure 5C:
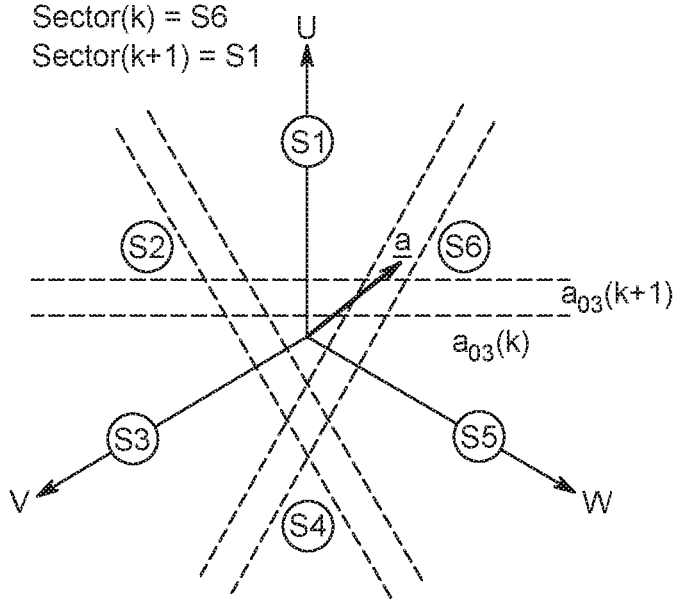
FIG. 5C shows a diagram illustrating an operating condition of an electrical power converter according to an embodiment of the invention.
Figure 5D:
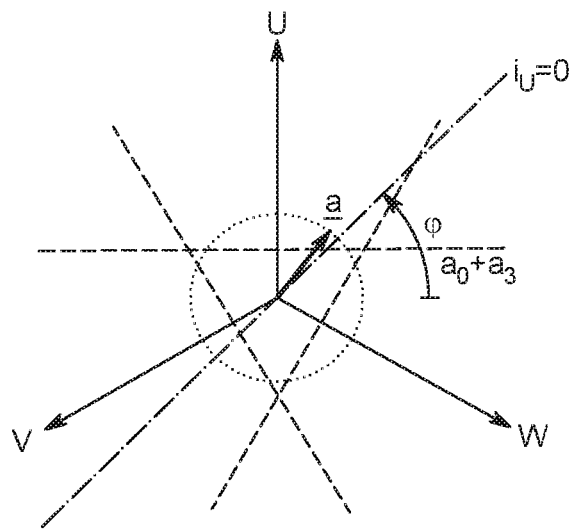
FIG. 5D shows a diagram illustrating an operating condition of an electrical power converter according to an embodiment of the invention.

Hereinafter follow descriptions of further embodiments. For a few of the operating conditions of the power converter, the definition of the operating conditions in accordance with Equation 16 also referred to as "sector definition" is ambiguous; see FIG. 5C. The procedure described hereinabove could potentially cause several rapid changes among two or more sectors, i.e., rapid transitions between several different operating conditions S1, S2, S3, S4, S5, S6, as a result of which distorted phase modulation depths or unnecessary switching operations could occur in the switches of the unit 220, said switches being configured as power semiconductors, for example.

In order to avoid these processes, an embodiment provides for testing whether the sector (k−1) (indexing variable "k") determined in a previous sampling step or the operating condition in the present sampling step (k) is still valid. If none of the sectors or operating conditions are valid, the modulation should be held at its previous value or fade gradually in order to avoid unnecessary switching operations.

For example, FIG. 5 illustrates a situation in which the power factor is approximately 0.7. The chain line indicates the angle at which the phase current $i_U$ of phase U becomes zero. Inasmuch as in sector 1 (operating condition "S1") the normal-mode component is a reciprocal function of $i_U$, the compensating modulation depth $a_0$ in this case has a pole. Although the common-mode component can be limited to the maximum or minimum available modulation, the sign of the zero sequence changes when the pole is being passed, if $|a_0+a_3|>|a_U|$, $|a_V|$, $|a_W|$, as a result of which additional switching operations would be triggered. As a result of this, the switching frequency is increased by the fundamental frequency of the output voltage, for example.

The efficacy of embodiments of the invention was verified by simulations with the use of a load 400 (FIG. 1) configured as a twelve-pole asynchronous machine having a rated frequency of 5.6 Hz and a rated power of 3.7 MW and compared to the efficacy of a conventional P control. Compared to drives with a rated frequency of 50 Hz, the amplitude of the DC intermediate circuit oscillations is clearly higher in the case of the presently selected asynchronous machine. Tests performed by the applicant have shown that, by applying embodiments of the invention, the amplitude of the DC intermediate circuit oscillations is clearly lower in most working points of the electrical power converter 200 (FIG. 1) than in a conventional P control.

Embodiments of the invention can be applied for the compensation of electrical center current momentary values, in particular in order to reduce or avoid asymmetries of the capacitor voltages of a DC intermediate circuit 210 comprising a capacitor C1, C2. Embodiments of the invention can be implemented in the device 1000 in hardware and/or software or firmware.

In a further embodiment, an optional modulation depth component $a_3$ can be used for optimizing a voltage utilization of the power converter 200. This can be done simultaneously with the influencing the current flowing into the at least one further connection point A3. A corresponding (non-disappearing) value for $a_3$ is added in this case to the terms of the corresponding aforementioned equations. In Equation 17, a value for the optional modulation depth component $a_3$ is stated in addition to the value for the desired electrical center current $i_{NPref}$, and then the compensating modulation depth $a_0$ is determined as in Equation 17. Accordingly, a compensating modulation depth determined in such a manner also allows—in addition to the setting of a desired electrical center current $i_{NPref}$—an optimized voltage utilization. The value of the optional modulation depth component $a_3$ can be determined with methods that are known per se.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating an N-level K-phase electrical power converter, wherein N is greater than or equal to 3 and K is greater than or equal to 1, the method comprising:
    providing a plurality of N connection points that each correspond to a definable potential, wherein a first connection point corresponds to a first potential, a second connection point corresponds to a second potential, and at least one further connection point corresponds to a further potential which is lower than the first and greater than the second potential;
    providing a plurality of K output connections that are each selectively connected to a respective one of the connection points via at least one switching device;
    having at least one current flowing into the at least one further connection point;
    determining possible values for a compensating modulation depth suitable to be used for modification of a desired modulation depth for at least one phase for different operating conditions of the power converter;
    determining an actual operating condition dependent on at least one desired modulation depth and/or the compensating modulation depth; and
    selecting the suitable value to be used for the compensating modulation depth;

wherein the determining possible values for the compensating modulation depth ($a_0$) is dependent on the following equation:

$$a_0 = \begin{cases} \frac{a_V i_W + a_W i_V - i_{NPRef}}{2(i_V + i_W)} - a_3 & \text{for } S1; \\ \frac{a_U i_V + a_V i_U + i_{NPref}}{2(i_U + i_V)} - a_3 & \text{for } S2; \\ \frac{a_U i_W + a_W i_U - i_{NPref}}{2(i_U + i_W)} - a_3 & \text{for } S3; \\ \frac{a_V i_W + a_W i_V + i_{NPref}}{2(i_V + i_W)} - a_3 & \text{for } S4; \\ \frac{a_U i_V + a_V i_U - i_{NPref}}{2(i_U + i_V)} - a_3 & \text{for } S5; \\ \frac{a_U i_W + a_W i_U + i_{NPref}}{2(i_U + i_W)} - a_3 & \text{for } S6; \end{cases}$$

wherein $a_0$ is the compensating modulation depth, $a_U$ is a desired modulation depth for a first phase, $a_V$ is a desired modulation depth for a second phase, $a_W$ is a desired modulation depth for a third phase, $i_U$ is a phase current of a first phase, iv is a phase current of a second phase, $i_W$ is a phase current of a third phase, $i_{NPref}$ is a desired value for the current flowing into the at least one further connection point, $a_3$ is an optional modulation depth component, and Sx corresponds to an xth operation condition, x=1, . . . , 6.

2. The method according to claim 1, wherein the power converter is a three level, N=3, three phase, K=3, power converter and having at least one current flowing into the at least one further connection point is dependent on at least one phase current of a phase and/or at least one modulation depth of a phase.

3. The method according to claim 1, wherein having at least one current flowing into the at least one further connection point comprises modifying a desired modulation depth for at least one phase, wherein the modifying includes adding a compensating modulation depth to the desired modulation depth for the at least one phase.

4. The method according to claim 2, wherein having at least one current flowing into the at least one further connection point comprises modifying a desired modulation depth for at least one phase, wherein the modifying includes adding a compensating modulation depth to the desired modulation depth for the at least one phase.

5. The method according to claim 1, further comprising, after determining possible values for a compensating modulation depth, limiting the possible values of the compensating modulation depth.

6. The method according to claim 5, further comprising comparing the actual operating condition with a previous operating condition and, if the actual operating condition differs from the previous operating condition, modifying the compensating modulation depth for the actual operating condition in dependence of the compensating modulation depth for the previous operating condition.

7. The method according to claim 1, further comprising comparing the actual operating condition with a previous operating condition and, if the actual operating condition differs from the previous operating condition, modifying the compensating modulation depth for the actual operating condition in dependence of the compensating modulation depth for the previous operating condition.

8. The method according to claim 1, wherein the determining the actual operating condition is dependent on the following inequalities:

$S1: a_U + a_{03} > 0, a_V + a_{03} < 0, a_W + a_{03} < 0,$ $S2: a_U + a_{03} > 0, a_V + a_{03} > 0, a_W + a_{03} < 0,$ $S3: a_U + a_{03} < 0, a_V + a_{03} > 0, a_W + a_{03} < 0,$ $S4: a_U + a_{03} < 0, a_V + a_{03} > 0, a_W + a_{03} > 0,$ $S5: a_U + a_{03} < 0, a_V + a_{03} < 0, a_W + a_{03} > 0,$ $S6: a_U + a_{03} > 0, a_V + a_{03} < 0, a_W + a_{03} > 0,$ wherein $a_{03}=a_0+a_3$.

9. The method according to claim 1, further comprising providing a DC intermediate circuit, which comprises a series connection of a plurality of (N−1) capacitors between the first connection point and the second connection point, wherein the further connection point is a junction at which a jth capacitor of the series connection is connected to a (j+1)th capacitor of the series connection, wherein $1 <= j <= N-2$.

10. A device for operating an N-level K-phase electrical power converter, wherein N is greater than or equal to 3 and K is greater than or equal to 1, the device comprising:
a plurality of N connection points that each correspond to a definable potential, wherein a first connection point corresponds to a first potential, a second connection point corresponds to a second potential, and at least one further connection point corresponds to a further potential lower than the first and greater than the second potential;
a plurality of K output connections, each selectively connected to a respective one of the connection points via at least one switching device,
wherein at least one current flowing into the at least one further connection point;
wherein the device:
determines possible values for a compensating modulation depth suitable to be used for modification of a desired modulation depth for at least one phase for different operating conditions of the power converter, the determining being dependant on the following equation:

$$a_0 = \begin{cases} \frac{a_V i_W + a_W i_V - i_{NPRef}}{2(i_V + i_W)} - a_3 & \text{for } S1; \\ \frac{a_U i_V + a_V i_U + i_{NPref}}{2(i_U + i_V)} - a_3 & \text{for } S2; \\ \frac{a_U i_W + a_W i_U + i_{NPref}}{2(i_U + i_W)} - a_3 & \text{for } S3; \\ \frac{a_V i_W + a_W i_V + i_{NPref}}{2(i_V + i_W)} - a_3 & \text{for } S4; \\ \frac{a_U i_V + a_V i_U - i_{NPref}}{2(i_U + i_V)} - a_3 & \text{for } S5; \\ \frac{a_U i_W + a_W i_U + i_{NPref}}{2(i_U + i_W)} - a_3 & \text{for } S6; \end{cases}$$

wherein $a_0$ is the compensating modulation depth, $a_U$ is a desired modulation depth for a first phase, $a_V$ is a desired modulation depth for a second phase, $a_W$ is a desired modulation depth for a third phase, $i_U$ is a phase current of a first phase, $i_V$ is a phase current of a second phase, $i_W$ is a phase current of a third phase, $i_{NPref}$ is a desired value for the current flowing into the at least one further connection point, $a_3$ is an optional modulation depth component, and Sx corresponds to an xth operation condition, x=1, . . . , 6;
determines an actual operating condition dependent on at least one desired modulation depth and/or the compensating modulation depth; and
selects the suitable value to be used for the compensating modulation depth.

11. The device according to claim 10, wherein the power converter is a three level, N=3, three phase, K=3, power converter.

12. The device according to claim 10, further comprising a DC intermediate circuit, which includes a series connection of a plurality (N−1) of capacitors between the first connection point and the second connection point, wherein the further connection point is a junction at which a jth capacitor of the series connection is connected to a (j+1)th capacitor of the series connection, wherein $1 <= j <= N-2$.

* * * * *